United States Patent

[11] 3,619,503

[72] Inventor Robert Gordon Ragsdale
Hollywood, Fla.
[21] Appl. No. 877,880
[22] Filed Nov. 18, 1969
[45] Patented Nov. 9, 1971
[73] Assignee International Communications Corporation
Miami, Fla.

[54] PHASE AND AMPLITUDE MODULATED MODEM
17 Claims, 6 Drawing Figs.

[52] U.S. Cl. .......... 178/66, 178/67, 325/38, 325/30
[51] Int. Cl. .......... H04l 27/10
[50] Field of Search .......... 178/66, 67; 325/30, 38, 38 A, 39, 40, 61, 139, 141

[56] References Cited

UNITED STATES PATENTS

| | | | |
|---|---|---|---|
| 3,128,342 | 4/1964 | Baker | 178/67 X |
| 3,305,636 | 2/1967 | Webb | 325/40 X |
| 3,406,343 | 10/1968 | Mehlman | 325/40 |
| 3,412,206 | 11/1968 | Bizet et al. | 178/67 |

*Primary Examiner*—Benedict V. Safourek
*Attorney*—Jackson and Jones

ABSTRACT: A method and apparatus for generating phase and amplitude modulated signals to be transmitted and for demodulating the transmitted signals with improved reliability and accuracy is disclosed. A modulator at the transmitter is adapted to continuously group digital data into multibit words of equal length. The modulator is responsive to predetermined multibit subgroups within each multibit word to differentially phase modulate a carrier signal during successive modulation periods. The modulator is further responsive to the remaining bits within each multibit word to amplitude modulate the carrier signal during successive modulation periods. A demodulator is provided at the receiver. A differential phase detection portion of the demodulator reconstitutes the multibit subgroup digital data phase encoded at the modulator. A variable gain amplifier at the receiver varies the amplitude of the received signal in accordance with derived gain selection commands. The gain selection commands are derived from an amplitude detection portion of the receiver. The amplitude detection portion also provides a digital output indicative of the remaining portion of the multibit words originally encoded. The derived gain selection commands vary the gain of the receiver amplifier to cause the output amplitude levels of the amplifier to accurately correspond to the originally encoded amplitude levels. The accurately corresponded amplitude levels insure correct amplitude detection at the receiver.

| DATA | | CODE | | |
|---|---|---|---|---|
| | | | ANGLE DIFFERENCE | AMPLITUDE |
| 0 | 0 | 1 | 0° | 1 |
| 0 | 0 | 0 | 0° | 0 |
| 1 | 0 | 0 | 90° | 0 |
| 1 | 0 | 1 | 90° | 1 |
| 1 | 1 | 1 | 180° | 1 |
| 1 | 1 | 0 | 180° | 0 |
| 0 | 1 | 0 | 270° | 0 |
| 0 | 1 | 1 | 270° | 1 |

INVENTOR.
ROBERT GORDON RAGSDALE
BY Jackson & Jones
ATTORNEYS

INVENTOR.
ROBERT GORDON RAGSDALE
BY Jackson & Jones
ATTORNEYS

INVENTOR.
ROBERT GORDON RAGSDALE
BY Jackson & Jones
ATTORNEYS.

INVENTOR
ROBERT GORDON RAGSDALE
BY Jackson + Jones
ATTORNEYS

PHASE AND AMPLITUDE MODULATED MODEM

BACKGROUND OF THE INVENTION

1. Field of the Invention

The field of this invention includes communication systems for digital data and particularly includes such communication systems employing telephone lines, associated telephone circuitry and the like as randomly selected in various combinations for data transmission.

2. Description of the Prior Art

Digital data transmission over voice grade telephone lines and associated telephone circuits is a well-known art. Known modems transmit information by either phase modulating, amplitude modulating, or phase and amplitude modulating a carrier signal during a plurality of successive modulation periods.

Known systems however suffer from a variety of defects which render them unsuitable for high bit rate operation. Amplitude modulation modems utilize a plurality of amplitude levels to represent the bit values transmitted during each successive modulation period. The amplitude distortion characteristics of telephone transmission lines render the reconstitution and detection of the various amplitude levels at the receiver extremely complex thus limiting the feasible bit rate operation to relatively slow speeds. High bit rate phase modulation modems also are unreliable due to the inherent phase distortions introduced by telephone transmission lines. The relatively large number of closely spaced phase levels utilized for high bit rate operation require detection resolution which is beyond the abilities of known demodulation apparatus.

Combination amplitude and phase modulation modems offer an apparently attractive alternative since high bit rate operation is theoretically achievable utilizing fewer individual amplitude levels and fewer individual phase levels. This inherently increases the amplitude and phase distortions tolerable.

Known phase and amplitude modulated modems, however, suffer from a variety of defects. First the modulation techniques utilized, since they require both phase and amplitude modulation, are often cumbersome and expensive. Second, in any multiphase-plural amplitude level system, a major problem at the demodulator is to establish a proper logic level selection point which, at a sample time, is precisely between the points for a "one" and "zero" amplitude detection level. Randomly selected telephone lines exhibit amplitude distortions which vary from line to line and even vary in a selected line during the course of a single transmission. Some dynamic compensation means for amplitude distortion is therefore required. Known modems of the above type suffer unacceptable error rates at high bit rate operation due to their inability to provide such dynamic amplitude corrections.

SUMMARY OF THE INVENTION

In accordance with the present invention there is provided a unique method and apparatus for generating phase and amplitude modulated signals to be transmitted and for demodulating the transmitted signals with improved reliability and accuracy. The modem of this application is particularly suited for system approaches utilizing narrow bandwidth limiting of signals to be transmitted.

A modulator at the transmitter is adapted to continuously group digital data into multibit words of equal length e.g. three binary bits per word. The modulator is responsive to preselected data combination subgroups such as a predetermined multibit subgroup within each multibit word to differentially phase modulate a carrier signal. That is, during successive modulation periods, the carrier is provided with predetermined phase differences relative to the phase of the carrier in the immediately preceding modulation period. The phase differences are provided as a function of the multibit subgroup data patterns. The modulator is further responsive to the remaining bits within each multibit word to vary the amplitude of the carrier signal. The carrier is thus provided with predetermined amplitude levels during successive modulation periods which represent the data patterns of the remaining portion of each multibit word In a word of three binary bits there are eight possible data combinations. The eight possible data combinations may be divided into an even number of subgroups, 2 or 4, and each resulting subgroup then represents a number of possible words which is equal to eight divided by the number of subgroups. For example, the values of the first two bits may define four possible data subgroups and each subgroup then forms one of two possible words depending upon the value of the third bit. To define each word with a phase and amplitude modulated carrier signal, each of four possible phases may be assigned to a selected data subgroup and each of two possible amplitudes may be assigned to a selected data combination within each subgroup.

The phase and amplitude modulated carrier signal thus derived is applied to a transmission link which may in accordance with this invention be a randomly selected telephone line.

At the receiver of my invention a demodulator is provided. A differential phase detection portion of the demodulator receives the modulated carrier signal and provides a multibit digital output representing the multibit subgroups phase encoded at the modulator.

The modulator is further provided with a variable gain amplifier such as an AGC. The variable gain amplifier is provided with the received amplitude distorted carrier signal. A digitizer provides a digital output signal corresponding to the detected amplitude level of the amplifier's output. A portion of the digital output signal represents the remaining portion of the multibit words originally encoded at the modulator.

The remainder of the digital output signal is used to derive a gain control signal. The gain control signal varies the gain of the variable gain amplifier to accurately correspond the amplitude levels of the variable gain amplifier's output signal with the amplitude levels originally encoded into the carrier by the modulator. The variable gain amplifier, thus controlled, accurately compensates for amplitude distortions introduced by the transmission link and associated circuitry to enable error free amplitude detection.

BRIEF DESCRIPTION OF THE DRAWINGS

The foregoing features and objects of this invention may be more fully appreciated by reference to the accompanying drawings in which.

DESCRIPTION OF THE PREFERRED EMBODIMENT

Figures 1, 2A:
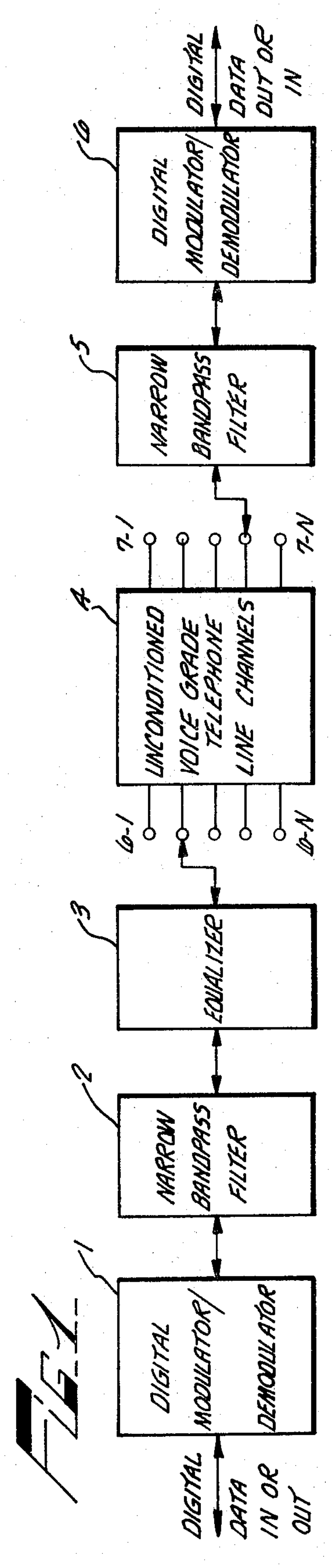
FIG. 1 is a block diagram of a known digital data communication system using narrow bandwidth limited signals to be transmitted, which approach is suitable for incorporation with the apparatus of the present invention.
FIG. 2A is a chart depicting assigned phase angle increments and amplitude levels for different groups of multibit data patterns.

Turning now to the drawings, the broad aspects of the invention described in a copending earlier filed patent application entitled "Equalization Circuit," having Ser. No. 709,608, now U.S. Pat. No. 3,550,005 and assigned to the same assignee as the present invention, are disclosed in the block diagram of FIG. 1. Systems of the kind depicted in FIG. 1 are useful in practicing the present invention. Reference to the earlier filed application may be made if full details of the earlier claimed invention are required. Briefly, however, the block diagram of FIG. 1 depicts a digital data input, such as that normally provided by a computer or other digital data source, which data is applied to the modulator portion of a digital modulator/demodulator 1.

Output signals from digital modulator 1 are band limited in narrow band-pass filter 2, equalized at a fixed and/or variable equalizer 3, and passed through a randomly selected telephone line channel. It should be understood that such telephone line channels normally include exchange lines, long and short call lines and the associated switching networks necessary to establish a complete communication link from the transmitter to the receiver. The various telephone lines 6–1 through 6–N, and the lines 7–1 through 7–N, it should be understood, are selected by local and/or remote telephone switching equipment, in accordance with availability and other telephone control priority criteria. These telephone line channels are typically considered as unconditioned voice grade in that they are unequalized or uncompensated telephone circuits which are generally available for voice of teletype communication as well as available for data transmission utilizing the principles of this invention.

At the receiver portion of FIG. 1, the band limited signals are recovered band limited by narrow band-pass filter 5 and passed through the demodulator portion of digital modulator/demodulator 6 to restore the digital levels. Since it is normally desirable for each station to have the ability to both send and receive information, each such station is preferably provided with both a modulator and a demodulator, as shown.

The digital modulated signals from modulator 1 are band limited by a narrow band-pass filter 2, which band-pass filter, in conjunction with band-pass filter 5, at the receiver, form a composite network having a linear phase. The band-pass width is preferably defined by 1/T Hz. with its center frequency at $f_o$, the carrier frequency of the digital modulator 1. T is the modulation period. As is discussed in more detail in the above identified copending application, typical examples for the carrier frequency, $f_o$, may be 1700 $H_z$ for transmission of either 2400 bits per second, or 4800 bits per second. The bandwidth will be less than 1000 $H_z$ for 2400 bits per second, and it will normally be in the order of 1600 $H_z$ for 4800 bits per second. The narrow bandwidth for the two typical given examples is thus approximately 1300 $H_z$ to 2100 $H_z$ for 2400 bits per second or 900 $H_z$ to 2500 $H_z$ for 4800 bits per second. These bandwidth characteristics provide an envelope shape particularly useful for clock derivations and information storage. For example, the envelope of one digital modulated signal, after it passes through the equalizer 3 and a randomly selected telephone channel, includes a peak amplitude at the middle of its assigned modulation period T. The amplitude of the envelope drops toward zero at the mid points of adjacent, preceding and successive modulation periods.

The technique of data transmission employed in this invention consists of a combination differential four-phase and amplitude modulated signal. Such signals contain four different phase differences of 90° each. Each differential phase modulated signal is given one of two amplitude levels. Multibit groups of digital levels are assigned given phase differences and amplitude levels. Detection of the amplitude levels and comparison of a given phase with a preceding phase provides a ready demodulation scheme as described in more detail hereinafter.

Figure 2:
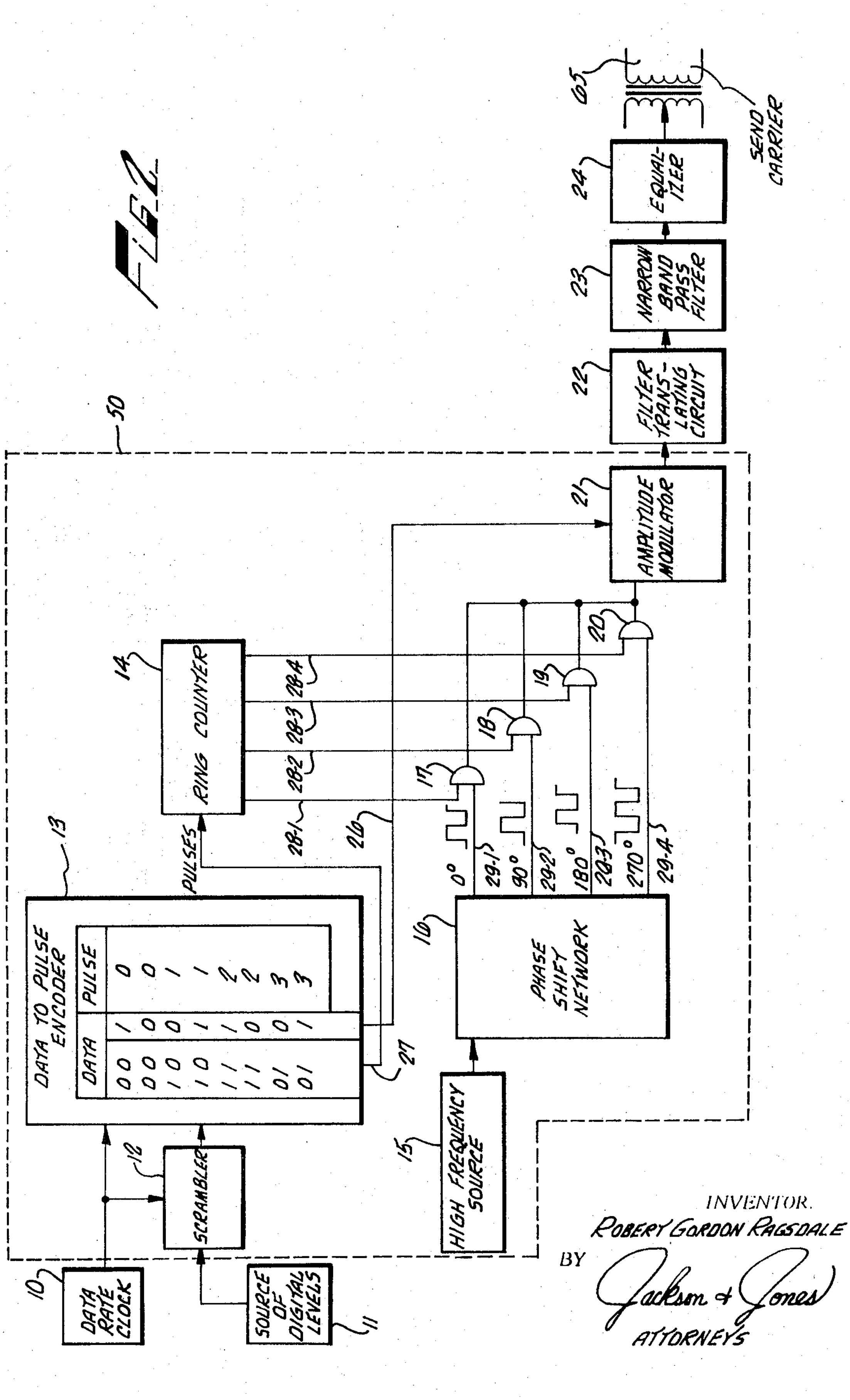
FIG. 2 is a block diagram of a digital differential phase and amplitude modulator incorporating the principles of the present invention.

Turning now to FIG. 2, a block diagram of an improved phase and amplitude modulator 50 is shown. Serial binary data at a preselected data bit rate, for example 2400 bits per second, is provided by a source of digital levels 11 to a scrambler 12. Scrambler 12 also receives a synchronizing data rate clock signal from data rate clock 10. Scrambler 12, in a well-known manner, scrambles the input data bits to assure that repetitive data patterns are "randomized" before being applied to the remainder of the modulation system. Randomization of the input data patterns is desirable since it has been found that transmission of repetitive data patterns results in distortion of the information content of the modulated carrier waveform.

The scrambled binary data at the data bit rate and the data rate clock are applied to a data to pulse encoder 13. Encoder 13 examines the incoming serial data in equal 3-bit member groups. Three counts of the incoming data rate clock cause encoder 13 to examine each 3-bit data group stored in the encoder during each 3-count interval.

Encoder 13 sends out groups of high frequency pulses every 3-clock count interval which intervals correspond to modulation periods, T. The number of pulses in each group is a function of the first two bits of each 3-bit member group or "data word" as shown by the table within encoder 13. Thus, as illustrated, when the data word is 100, one pulse is provided by encoder 13 for the corresponding modulation interval. When the data word is oil, three pulses are provided by encoder 13, etc. The pulse groups will be separated in time as determined by the time required to count 3-data rate clock pulses which, as previously described, represents a modulation period.

The series of groups of pulses thus generated is supplied to a ring counter 14. Ring counter 14 has four outputs 28–1 to 28–4 as shown. As is characteristic of counters of this type, at any instant of pulse time one and only one of these outputs is in a "true" or "on" condition. The remaining outputs are in a "false" or "off" condition. The pulses applied to ring counter 14 progressively shift the position of the "on" output in a well-known manner. For example, one pulse shifts the counter output one position, two pulses shift the counter output two positions, etc.

The ring counter output lines 28–1 to 28–4 enable a plurality of "AND" gates 17–20 respectively. The other input to "AND" gates 17–20 is derived from a phase shift network 16.

Phase shift network 16 receives a high frequency sinusoidal signal from a high frequency source 15. High frequency source 15 may typically have an output rate well in excess of the data rate. Phase shift network 16 provides four sinusoidal outputs on lines 29–1 to 29–4 respectively. All four outputs provide continuous equal amplitude high frequency sinusoidal signals at phase angles separated by 90° increments. These four sinusoidal signals are selectively connected to an amplitude modulator 21 by AND gates 17–20 respectively.

AND gates 17–20, as previously described, are selectively enabled by the output of ring counter 14. Since one and only one output of the ring counter is in the "on" state, one and only one AND gate is enabled at a given time; therefore, one and only one sinusoidal signal at a time is provided to amplitude modulator 21.

The AND gates 17–20 are selectively enabled according to the number of pulses from encoder 13 generated each modulation period. Since each sinusoidal output is phase separated by 90° from adjacent signals, the number of pulses represent multiples of 90° in phase shift. Thus, the desired degree of phase between adjacent modulation periods is achieved as a function of the first two bits of each 3-bit data word provided by scrambler 12.

As above described, the selected phase shifted sinusoidal signals are applied to amplitude modulator 21. Amplitude modulator 21 has as a second input the value of the third bit from each three-bit data word assembled in encoder 13. Modulator 21 amplitude modulates the applied sinusoidal signals in accordance with the bit value derived from encoder 13. For example, one binary weighted value such as a binary "one" is represented by one discrete amplitude level while a binary "zero" is represented by a second discrete amplitude level.

The output signal from amplitude modulator 21 will therefore comprise a combination differential phase and amplitude modulated high frequency waveform wherein the modulation is effected in accordance with a predetermined modulation code.

One typical multibit code adaptable for use in this invention is shown in FIG. 2A and includes a multibit grouping which is based on three binary bits. As shown in FIG. 2A, a given phase difference is assigned to each available pattern of zeros and ones within each two-bit subgroup of each group of three binary bits. A given amplitude level is assigned in accordance with the value of the remaining bit within each three-bit group.

Since there are only eight different possible bit patterns for a 3-bit grouping, all possible data combinations may be uniquely defined by four discrete phase differences in conjunction with only two discrete amplitude levels. Thus, each individual two data bit subgroup pattern has assigned thereto a phase angle which differs by at least 90° from all other subgroup patterns. The phase outputs are thus in multiples of 90° wherein the multiples are 0, 1, 2, and 3. Each two data patterns assigned equal phase differences are differentiated by being further assigned different amplitude levels, as shown.

The phase and amplitude modulated output from amplitude modulator 21 is applied to a filter and translating circuit 22. Circuit 22 translates the high frequency modulated signal down to a low frequency phase and amplitude modulated carrier signal, $f_o$, wherein the phase and amplitude relationships are unchanged by the frequency transposition process. This low frequency signal is applied to a send carrier line 65 which may be any leased or fortuitously selected telephone line as typical examples.

The amplitude and delay characteristics for the carrier line are compensated for by a narrow band-pass filter 23 and a fixed and/or variable equalizer 24. One typical such equalizer 24 is fully described in the previously mentioned copending application entitled "Equalization Circuit." The combination of filter 23 and the equalizer 24 allows for a composite communication link having approximately a linear phase and a narrow bandwidth. The bandwidth for a data rate of 2400 bits per second is preferably about 800 Hz. with a center frequency, $f_o$, at approximately 1700 Hz.

Figure 3:
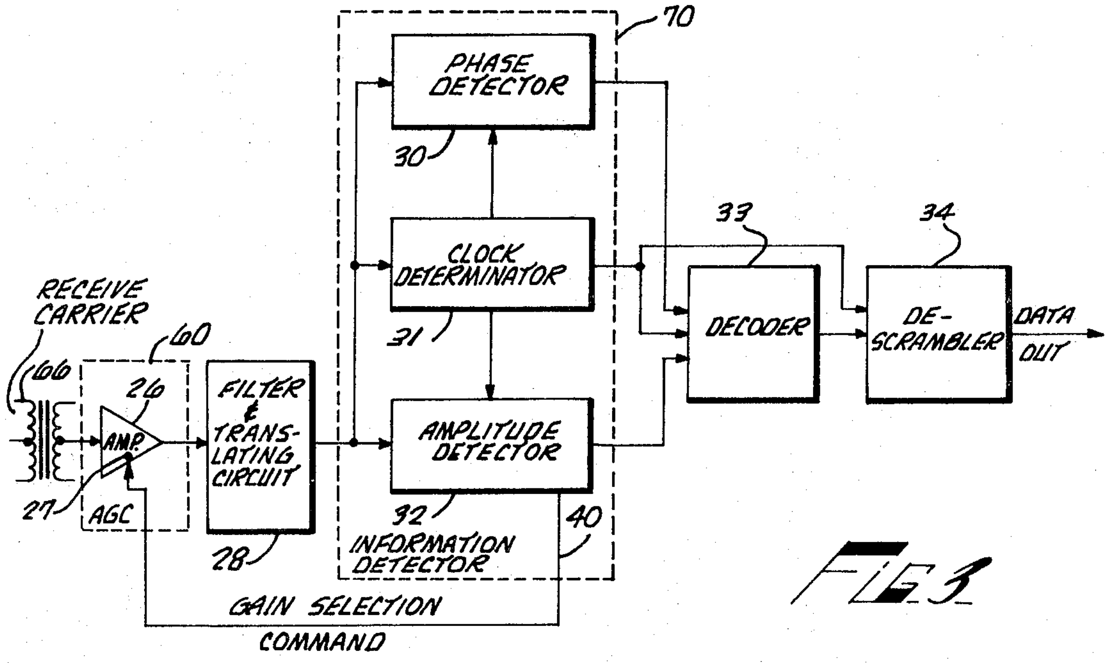
FIG. 3 is a block diagram of the receiver apparatus incorporating the principles of the present invention.

Referring now to FIG. 3, the transmitted low frequency modulated signal is received by received carrier line 66. The signal thus received is applied to an automatic gain control (AGC) 60. Automatic gain control 60 adjusts the amplitude of the received signal to ensure that subsequent amplitude detection circuit 32 receives properly reconstituted amplitude levels which may readily be detected as corresponding to the originally encoded amplitude levels.

The details of the amplitude correction feature will be described in greater detail hereinafter. Briefly, however, automatic gain control 60 may comprise a feedback amplifier 26, having, as shown, a feedback control terminal 27.

Control terminal 27 receives a gain selection command obtained on line 40 from amplitude detector 32. The gain selection command, which is obtained in a manner to be described in detail hereinafter, provides AGC 60 with a gain control signal to accurately correspond the AGC output with either the amplitude levels originally established by modulator 21, FIG. 2, or any other desired amplitude levels functionally related to those originally established by modulator 21.

The output of AGC 60 is applied to a filter and translating circuit 28 which translates the low frequency angle and amplitude modulated carrier signal, $f_o$, back up to a high frequency signal without distorting the phase and amplitude relationships. The high frequency signal output from filter and translating circuit 28 is applied to an information detector circuit 70.

Information detector 70 comprises a phase detector 30, a clock determinator 31, and the previously mentioned amplitude detector 32, all of which receive the high frequency phase and amplitude modulated output from circuit 28.

Phase detector 30 is adapted to detect the phase differences of the high frequency carrier during successive modulation periods and provide the phase difference indications thus obtained to a decoder 33, as shown. One typical such phase detector 30 is fully described in the copending application entitled "Digital Differential Angle Demodulator," having Ser. No. 807,671, and assigned to the same assignee as the present invention.

Information detector 70 further contains a clock determinator 31. Clock determinator 31 receives the high frequency carrier envelope and derives sample clock pulses which are used to initiate the phase detection and amplitude detection operation at the midportion of each modulation period. Clock determinators of the kind described are well-known in the art and need not be described in detail here Amplitude detector 32 responsive to the received high frequency modulated signal and the received sample clock pulse generates a signal indicative of the amplitude level of the carrier envelope during each modulation period.

Decoder 33 is thus supplied, for each modulation period, with information relating both to the phase difference and amplitude level of the received signal. Decoder 33 recombines the information thus described in a manner which is essentially the inverse of that originally described with respect to the modulator into 3-bit data groups which correspond to the data groups originally encoded. The multibit groups thus derived are applied to a descrambler 34 which performs the inverse operation to that performed by scrambler 12, FIG. 2, and provides a digital data output representative of the original digital levels.

Figure 4:
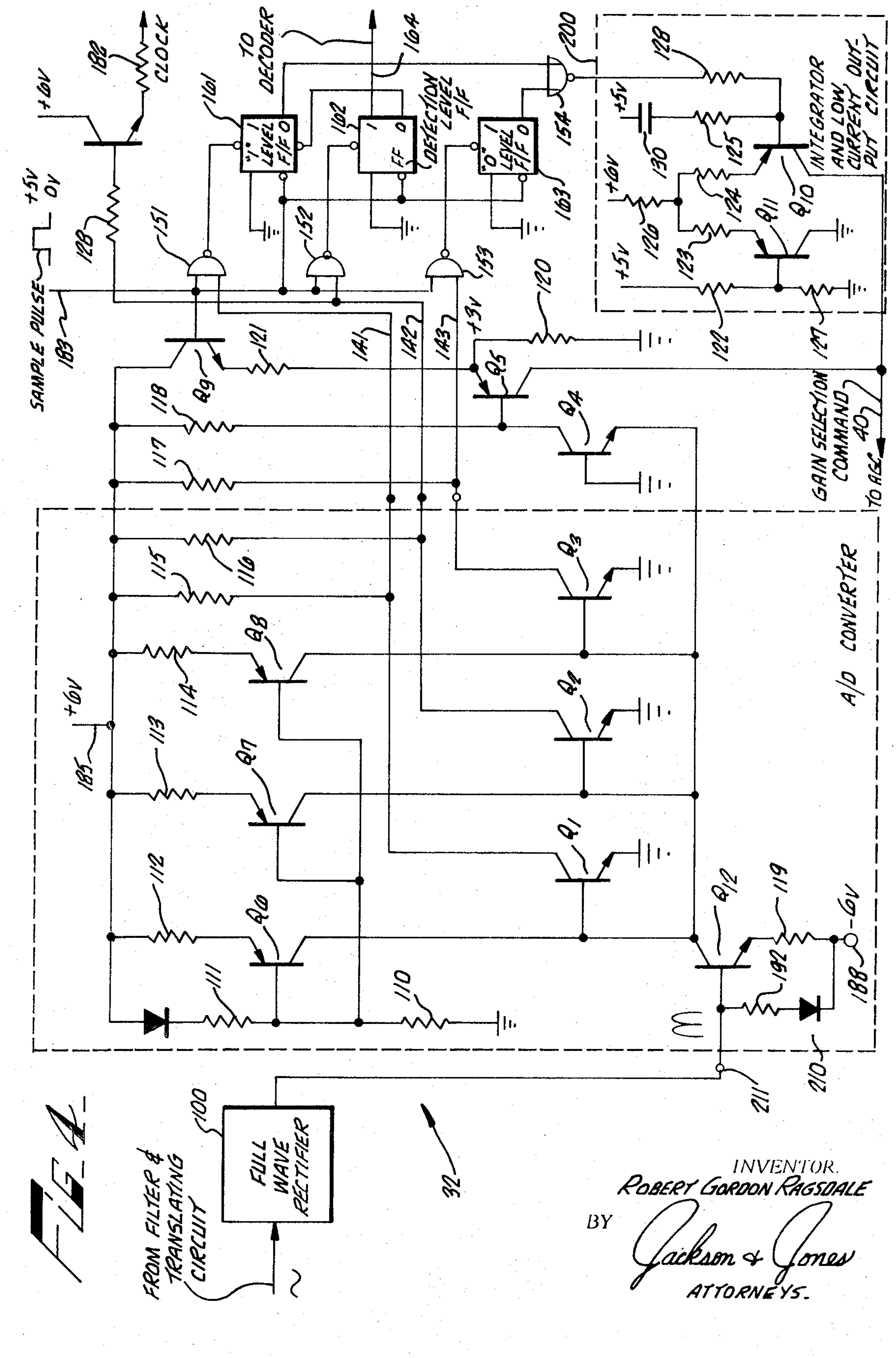
FIG. 4 is a combined block diagram and circuit schematic in more detail of the amplitude detector of FIG. 3.

Turning now to FIG. 4, the amplitude detection circuitry including the apparatus for generating the gain selection command signals is shown in detail. Before describing the operation of the circuitry of FIG. 4, reference is first made to FIG. 5 wherein there is shown a graphical representation of the amplitude detection and gain control features of the present invention.

Figure 5:
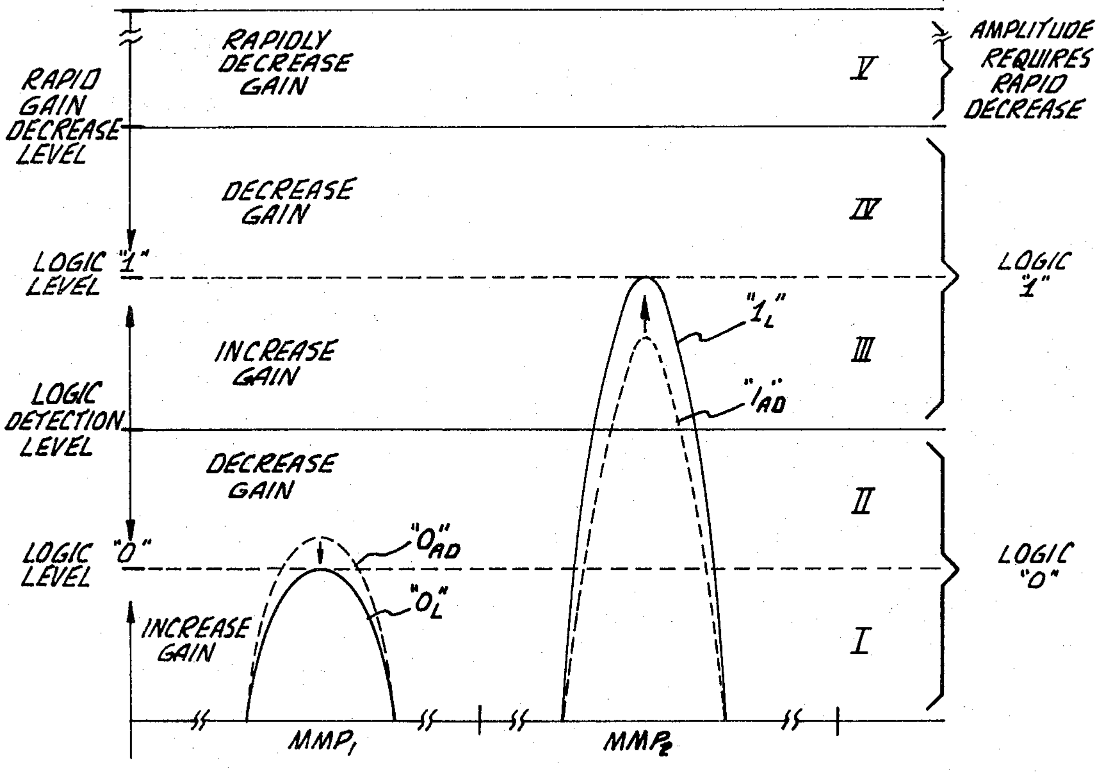
FIG. 5 shows two exemplary amplitude modulated halfwaves and is useful in promoting a clearer understanding of the gain control feature of this invention.

Shown by two solid half-waveforms in expanded time scale in FIG. 5 are two ideal logic level half-waveforms "$\mathbf{0}_L$" and "$\mathbf{1}_L$." "$\mathbf{0}_L$" and "$\mathbf{1}_L$" represent an ideal logic "zero" level and an ideal logic "one" level respectively. A logic level selection point or logic detection level is preferably located midway between the logic "0" level and the logic "1" level. The logic detection level is the level used to decide whether a logic "0" amplitude or a logic "1" amplitude is present. Stated in other words, if the amplitude of the envelope received by amplitude detector 33 during a given modulation period is below the detection level, a logic "0" is detected. If the amplitude is above the logic detection level, a logic "1" is detected.

For this reason, it is necessary that the detection level remain substantially halfway between the logic "0" and the logic "1" levels, since any movement form this ideal location will reduce the magnitude of random noise induced amplitude variations which can be tolerated without detecting an erroneous logic level.

To assure that the position of the logic detection level is optimized relative to the amplitudes of the signal applied to amplitude detector 32, FIG. 3, the amplitude detector, as previously mentioned, generates a gain selection command which continually adjusts the gain of AGC 60 to assure that the amplitude levels supplied to detector 32 remain close to the ideal logic "0" and the logic "1" amplitude levels. The gain selection command signals are obtained by dividing the detected amplitude modulated signal into five amplitude zones. The amplitude zones I–V are illustrated in FIG. 5.

If the amplitude of the amplitude detected signal is in amplitude zone I, wherein the amplitude is below the logic "0" level, a gain selection command is generated to increase the gain of AGC 60, FIG. 3. If the detected signal amplitude, however, is above the logic "0" level, but below the logic detection level, a gain selection commmand is generated to decrease the gain of the automatic gain control. Waveform "O"$_{ad}$ shown dotted in FIG. 5, is illustrative of an amplitude detected signal in the zone II amplitude range.

Proper gain selection commands for amplitude zones III and IV are generated in a similar manner by monitoring the logic detection level and the logic "1" level. The "sense" of the proper gain selection command applied to automatic gain control is indicated for each zone. For example, waveform "1"$_{ada}$, shown dotted in FIG. 5, is illustrative of a detected logic "1" which, since it is below logic "1" level, requires a gain selection command which increases the gain of the automatic gain control, as shown by the arrow in FIG. 5.

In addition to monitoring the logic "O," logic detection and logic "1" levels, amplitude detector 31 also monitors a rapid gain decrease level which defines the lower boundary of zone V. It is sometimes found that when initiating a data transmission that the detected amplitude levels are significantly above the logic "0" and logic "1" levels rendering a decision at the logic detection level meaningless. To rapidly compensate for such an over high amplitude, the amplitude detector monitors a predetermined rapid gain decreased level. When a detected amplitude is above the rapid gain decrease level, a gain selection command is generated to cause the automatic gain control to rapidly decrease the amplitude of its output signal until the detected amplitude levels fall within the amplitude zones I–IV wherein they are thereafter adjusted in accordance with the previous discussion.

Referring now to FIG. 4 there is shown a combined block diagram and circuit schematic in more detail of a suitable amplitude detector 32 of FIG. 3. The amplitude modulated high frequency carrier signal derived from filter and translating circuit 28, FIG. 3, is applied to full-wave rectifier 100 which full-wave rectifies the information signal. The information signal thus rectified is applied to input terminal 211 of analog to digital converter 210.

Analog to digital converter 210 provides outputs on lines 141, 142 and 143 when the detected amplitude level at the sample time is above the logic "0" level, logic detection level and logic "1" level, respectively. The details of the operation of analog to digital converter 210 need not be described with particularity. Briefly, however, resistors 111 and 110 determine the current supplied to normally "on" transistors $Q_1$, $Q_2$ and $Q_3$. Transistors $Q_1$, $Q_2$ and $Q_3$, when conducting, have their collector terminals essentially at ground potential, as shown. Transistor $Q_1$ is turned "off" when the amplitude of the full-wave rectified signal applied at terminal 211 reaches the logic "0" level. This causes the collector potential of $Q_1$ to go to approximately 6 volts.

In a like manner, transistors $Q_2$ and $Q_3$ are turned off when the amplitude of the full-wave rectified signal applied to terminal 211 reaches the logic detection level and the logic "1" level respectively. The presence of output signals on lines 141–143 is therefore dependent upon whether the amplitude of the full-wave rectified signal is above or below the associated logic levels.

The digital output signals on lines 141–143 are applied to AND gates 151, 152 and 153, respectively. AND gates 151–153 have, as second inputs, the sample clock pulses derived from line 183. The clock sample pulses are provided by clock determinator 31, FIG. 3, and preferably appear at the center of each modulation period. When enabled by such sample pulses, AND gates 151–153 pass the signal levels provided by digital output lines 141–143.

The outputs of AND gates 151–153 are provided to storage flip-flops 161, 162 and 163, respectively. The output of storage flip-flop 162 represents the logic detection level digital output provided by analog to digital converter 210 at the sample time and therefore represents the logic amplitude level of the received modulated information signal.

The output of flip-flop 163 is related to whether the detected signal amplitude level is above or below the logic "0" level. The output of flip-flop 161 is related to whether the detected signal amplitude is above or below the logic "1" level. The "0" outputs from flip-flops 161 and 163 are fed, as shown, to NOR gate 154. The "0" level output from flip-flop 162 is fed into a control terminal of flip-flop 161. Should the "0" output of flip-flop 162 be in a "true" or positive condition, such a condition will assure that flip-flop 161 is set in a logic "1" position irrespective of the signal supplied by AND gate 151.

The output from NOR gate 15 will therefore be a logic function of the states of flip-flops 161, 162 and 163, respectively. Table I below presents the function in tabular form wherein the flip-flop states and the output from NOR gate 154 is presented for each of the five amplitude zones I–V.

TABLE I

| Amplitude zone | "O" level FF state | Detection level FF state | "1" level FF state[1] | NOR gate output |
|---|---|---|---|---|
| I | 0 | 0 | 1 | False increase gain. |
| II | 1 | 0 | 1 | True decrease gain. |
| III | 1 | 1 | 0 | False increase gain. |
| IV and V | 1 | 1 | 1 | True decrease gain. |

[1] With control from detection FF.

61 The output from NOR gate 154 is fed into an integrator and low current output circuit 200. Circuit 200 operates upon the output from NOR gate 154 to generate a gain selection command each modulation period. The gain selection command signal is provided on output line 40 which signal is supplied to the automatic gain control 60, FIG. 3.

As shown, circuit 220 comprises a pair of balanced transistors $Q_{10}$ and $Q_{11}$ energized by a 6 low voltage source via relatively large resistor 126 and resistors 123 and 124. Connected between the base of transistor $Q_{10}$ and a 5 volt potential source is an integrating capacitor 130 and a series connected resistor 125. The emitter terminal of transistor $Q_{10}$ provides the output gain selection command signal.

Automatic gain controls typically function on an inverse feedback principle; that is, increasing the feedback signal typically decreases the gain. For this reason, when it is desired to decrease the gain of the automatic gain control, as where the received modulated signal is either in amplitude zones II or IV, it is necessary to increase the amplitude of the gain selection command signal. In a correlative manner, when it is required to decrease the gain, as where received modulated signal is in amplitude zones II, IV or V, it is necessary to increase the magnitude of the gain selection command signal.

The amplitude of the gain selection command is varied in accordance with the output of NOR gate 154. NOR gate 154 provides a zero voltage output signal when providing a "false" output condition and an approximately minus 2 volt signal when in a "true" output condition.

As may be appreciated by reference to FIG. 4, the output of NOR gate 154 is applied via resistor 128 to the base of transistor $Q_{10}$. Decreasing the voltage level applied to the base of transistor $Q_{10}$ increases the current conducted by the transistor and thus increases the gain selection command signal. Increasing the gain selection command signal, as previously described, decreases the gain of the automatic gain control. In a like manner application of the "0" voltage level signal to the base of transistor $Q_{10}$ decreases the current conducted, therefore decreasing the magnitude of the gain selection command signal and increasing the gain of the automatic gain control Capacitor 130 and associated resistor 125 integrates the output from NOR gate 154 and prevents rapid fluctuations of the gain selection command signal.

The integrator and low current output circuit 200 readily compensate for gain variations within amplitude zones I, II, III, and IV, in FIG. 5. However, for signal amplitude levels in zone V, it has been found desirable to bypass the integrator and low current outputs circuit 200 and provide a "rapid decrease gain" signal to terminal 40 which thereafter is supplied to the automatic gain control to cause a rapid decrease of the AGC gain.

This function is served inter alia by transistors $Q_4$, $Q_5$ and $Q_9$, of FIG. 4. Transistor $Q_9$ is in a normally "off" or nonconducting condition. Transistor $Q_9$ is turned on by the sample pulse, as shown, at the sample time. Transistor $Q_4$ is also normally in an "off" condition. However, is the amplitude of the detected signal is above the rapid gain decrease level, transistor $Q_4$ is turned "on" or rendered conductive. The "on" condition of transistor $Q_4$ biases transistor $Q_5$ "on." Thereafter, at the sample time, a relatively large current is supplied to the automatic gain control terminal 40 via terminal 185, transistor $Q_9$, relatively small resistor 121 and transistor $Q_5$. The high current applied to terminal 40 functions to rapidly decrease the gain of the automatic gain control and bring the output of the AGC to within one of the four amplitude zones I–IV wherein it will thereafter be controlled by the signal derived from integrator and low current output circuit 200.

Referring now to table II, exemplary values for the components of the analog to digital converter 210 and the integrator and low current output circuit 200 of FIG. 4 are shown.

TABLE II

| A/D Converter | | Integrator and Low Current Output Circuit | |
|---|---|---|---|
| Component | Value | Component | Value |
| 192 | 2000 Ω | 130 | 22 mfd. |
| 119 | 470 Ω | 122 | 47 KΩ |
| 110 | 1000 Ω | 123 | 1800 Ω |
| 111 | 3000 Ω | 124 | 1800 Ω |
| 112 | 1500 Ω | 125 | 2200 Ω |
| 113 | 2000 Ω | 126 | 10 KΩ |
| 114 | 2000 Ω | 127 | 47 KΩ |
| 115 | 10 KΩ | 128 | 22 KΩ |
| 116 | 10 KΩ | | |
| 117 | 10 KΩ | | |
| 118 | 1800 Ω | | |
| 128 | 1000 Ω | | |
| 182 | 1000 Ω | | |

The amplitude detector above described provides not only an accurate determination of the received amplitude levels but also simply and economically continuously varies the amplitude of the received signal to assure that the logic detection level is always optimally positioned in relation to the logic "0" and logic "1" levels. The system as described is capable of efficiently modulating, transmitting, and demodulating serial digital data at an extremely high bit rate while minimizing errors caused by the nonideal characteristics of the transmission link and associated circuitry.

What is claimed is:

1. In a data transmission system for sending digital data between a transmitter and a receiver over a transmission link by establishing predetermined phase differences and amplitude levels in a carrier signal during successive modulation periods representative of preselected data combinations which comprises:

a modulator at the transmitter including:

means for continuously grouping the digital date into multibit words of equal length;

means responsive to preselected data combination subgroups within each of the multibit words for providing predetermined phase differences in the carrier signal during successive modulation periods in such a manner that each of the subgroups corresponds to a predetermined phase difference relative to the phase of the carrier in the immediately preceding modulation period;

means responsive to the possible data combinations within each subgroup for varying the amplitude of the carrier signal during said successive modulation periods in such a manner that each possible data combination within each subgroup corresponds to a predetermined amplitude level; and filter means connected in the signal transmission link, the filter being characterized as having a passband width of about 1/T Hz. And a center frequency of $f_o$; where T is the modulation period;

$f_o$ is the carrier signal frequency, and

T/2 is cycles per second.

2. The data transmission system of claim 1 wherein said grouping means comprises:

storage means having three binary bit storage locations and responsive to the digital data to be transmitted for storing three binary bits of data during each modulation period.

3. The data transmission system of claim 2 wherein said phase difference providing means comprises:

means responsive to predetermined data patterns in two of said three storage locations for establishing phase differences in the carrier signal during successive modulation periods in accordance with the function N90°, where N=O, 1, 2 or 3, whereby phase differences of 0°, 90°, 180° and 270° will be established during successive modulation periods as a function of said predetermined data patterns.

4. The data transmission system of claim 3 wherein said carrier signal amplitude varying means comprises:

means responsive to the bit value of the remaining storage location for establishing one of two predetermined amplitude levels for the carrier signal for each modulation period, whereby the carrier signal will be provided with one of two predetermined amplitude levels as a function of the value of the remaining binary bit.

5. The data transmission system of claim 1 further comprising:

a scrambler receiving the digital data for scrambling the data, the scrambled data being supplied to the grouping means, whereby the grouping means will be provided with nonrepetitive successive data patterns.

6. In a data transmission system for sending digital data between a transmitter and a receiver over a transmission link by establishing predetermined phase differences and predetermined amplitude levels in a carrier signal during successive modulation periods representative of preselected data combinations, a demodulator at the receiver for detecting said phase differences and said amplitude levels to restore the digital data to its original format which comprises:

means responsive to the received modulated carrier signal for providing a multibit digital output as a function of the phase of said carrier signal during a modulation period relative to the phase of the carrier signal during the immediately preceding modulation period, said multibit digital output representing portions of said preselected data combinations;

means at the demodulator for varying the amplitude of said received modulated carrier signal;

means responsive to said varied amplitude carrier signal for providing a magnitude output signal corresponding to the amplitude of said amplitude varied carrier signal during each modulation period;

means responsive to the level of said magnitude output signal for generating a digital output signal representing the remaining portions of said preselected data combinations; and means responsive to the level of said magnitude output signal for generating a gain selection command for varying the gain of said amplitude varying means to accurately correspond said amplitude varied carrier signal with said predetermined amplitude levels.

7. The system of claim 6 wherein said amplitude varying means comprises:

a feedback amplifier receiving said modulated carrier signal, said feedback amplifier having a control terminal adapted to vary the gain of said amplifier as a function of control signals applied to said control terminal.

8. The system of claim 7 wherein said gain selection command generating means comprises:

means responsive to the level of said magnitude output signal for providing a digital magnitude signal the value of which is varied as a function of whether the magnitude output signal is above or below said predetermined amplitude levels;

means for time integrating the digital magnitude signals; and means for applying said integrated signals to the control terminal of said feedback amplifier.

9. The system of claim 8 wherein said gain varying means further comprises:

means responsive to the level of said magnitude output signal being substantially above the highest of the predetermined amplitude levels to bypass said time integrating means and provide a rapid gain decrease signal to the control terminal of said feedback amplifier.

10. The data transmission system of claim 6 wherein the carrier signal is provided with a first amplitude level representing a first data bit value and a second amplitude level representing a second data bit value and wherein said digital output signal generating means comprises:

means for generating a digital signal representing said first data bit value when said magnitude output signal is above a predetermined detection level; and means for generating a digital signal representing said second data bit value when said magnitude output signal is below said predetermined detection level.

11. The data transmission system of claim 10 wherein said predetermined detection level is approximately midway between said first and said second amplitude levels.

12. The data transmission system of claim 11 wherein the amplitude range of said magnitude output signal is divided into four zones; the first zone being below the said first amplitude level, the second zone being between said first amplitude level and said detection level, the third zone being between said detection level and said second amplitude level, the fourth zone being above said second amplitude level, said gain selection command generating means comprising:

means for generating a gain control signal which increases the gain of said amplitude varying means when said magnitude output signal is in said first or third zones; and means for generating a gain control signal which decreases the gain of said amplitude varying means when said magnitude output signal is in said second or fourth zones.

13. The data transmission system of claim 12 wherein there is a fifth amplitude zone, the fifth amplitude zone being substantially above said second amplitude level, said gain selection command generating means further comprising:

means for generating a gain control signal which rapidly decreases the gain of said amplitude varying means when said magnitude output signal is in said fifth amplitude zone.

14. In a data transmission system for sending digital data between a transmitter an a receiver over a transmission link, the combination which comprises:

modulating means at the transmitter for continuously grouping the digital data into multibit words of equal length and for generating a phase and amplitude modulated carrier signal in which the phase of the carrier signal between adjacent modulation periods is representative of first preselected digital data combination subgroups within each of the words, and the amplitude of the carrier signal during each modulation period is representative of second preselected digital data combinations within each subgroup wherein each such second preselected data combination corresponds to a predetermined amplitude level;

means at the transmitter for applying the phase and amplitude modulated carrier signal to the transmission link;

means at the receiver for detecting said phase differences and for generating a digital signal representative of said preselected multibit subgroup data patterns;

means at the receiver for varying the amplitude of said modulated carrier signal;

means responsive to said amplitude varied signal for generating a magnitude output signal corresponding to the amplitude of said amplitude varied carrier signal;

means responsive to the level of said magnitude output signal for generating a digital output signal representing the selected data combination within said subgroups; and means responsive to the level of said magnitude output signal for generating a gain selection command for varying the gain of said amplitude varying means to accurately correspond the amplitude of said amplitude varied carrier signal with said predetermined amplitude levels.

15. A method of demodulating an amplitude modulated carrier signal wherein the carrier signal has a first amplitude level represented by a first data bit value and a second amplitude level representing a second data bit value comprising the steps of:

varying the amplitude of the amplitude modulated carrier signal to provide a gain varied amplitude modulated carrier signal;

dividing the amplitude range of the gain varied modulated carrier signal into four zones, the first zone being below the first amplitude level, the second zone being between the first amplitude level and a detection level wherein the detection level is approximately midway between the first and second amplitude levels, the third zone being between the detection level and the second amplitude level, the fourth zone being above the second amplitude level;

detecting the amplitude of the amplitude varied modulated carrier signal;

decreasing the amplitude of the amplitude varied modulated carrier signal when the detected amplitude is in the second or fourth zone; and increasing the amplitude of the amplitude varied modulated carrier signal when the detected amplitude is in the first or fourth zone.

16. The method of claim 15 comprising the additional step of:

rapidly decreasing the amplitude of the amplitude varied carrier signal when the detected amplitude is substantially above the second amplitude level.

17. In a data transmission system for sending digital data between a transmitter and a receiver over a transmission link by establishing predetermined phase differences and amplitude levels in a carrier signal during successive modulation periods representative of preselected data combinations which comprises:

a modulator at the transmitter which includes:

means for continuously grouping serial digital data into words of three binary bits;

means for providing N90° phase differences in a carrier signal during successive modulation periods, where N=0, 1, 2 or 3, so that each of four possible data pattern subgroups corresponds to a predetermined phase difference relative to the phase of the carrier in an immediately preceding modulation period; and means for establishing one of two predetermined amplitude levels for the carrier signal during successive modulation periods so that each data combination of a subgroup corresponds to one of said two distinct predetermined carrier amplitude levels; and filter means connected in the signal transmission link, the filter being characterized as having a passband width of about 1/T Hz. And a center frequency of $f_o$; where T is the modulation period;

$f_o$ is the carrier signal frequency, and

T/2 is cycles per second.

* * * * *

PO-1050
(5/69)

UNITED STATES PATENT OFFICE
CERTIFICATE OF CORRECTION

Patent No. 3,619,503 Dated November 9, 1971

Inventor(s) Robert Gordon Ragsdale

It is certified that error appears in the above-identified patent and that said Letters Patent are hereby corrected as shown below:

| Column | Line | |
|---|---|---|
| 2 | 25 | "modulator" should be "demodulator" |
| 4 | 14 | "oil" should be "011" |
| 4 | 52 | after "phase""shift" is omitted |
| 6 | 72 | "1"ada should be "1"ad' |
| 7 | 2 | "31" should be "32" |
| 9 | 2 | "is" should be "if" |
| 9 | 58 | "date" should be "data" |
| 10 | 3 | "T/2" should be "Hz" |
| 12 | 67 | "T/2" should be "Hz" |

Signed and sealed this 8th day of May 1973.

(SEAL)
Attest:

EDWARD M.FLETCHER,JR.
Attesting Officer

ROBERT GOTTSCHALK
Commissioner of Patents